Jan. 30, 1968  SUSUMU SAWANO  3,366,856
METHOD AND SYSTEM FOR OPTIMUM CONTROL OF SERVOMECHANISMS
HAVING LOAD INERTIA VARIATION
Filed Feb. 13, 1964  2 Sheets-Sheet 1

*INVENTOR.*
Susumu Sawano

BY

Western & Western

INVENTOR.
Susumu Sawano

BY

Western & Western

United States Patent Office 3,366,856
Patented Jan. 30, 1968

3,366,856
METHOD AND SYSTEM FOR OPTIMUM CONTROL OF SERVOMECHANISMS HAVING LOAD INERTIA VARIATION
Susumu Sawano, Tokyo-to, Japan, assignor to Kabushiki Kaisha Hitachi Seisakusho, Tokyo-to, Japan, a joint-stock company of Japan
Filed Feb. 13, 1964, Ser. No. 344,607
Claims priority, application Japan, Feb. 15, 1963, 38/6,164
3 Claims. (Cl. 318—18)

ABSTRACT OF THE DISCLOSURE

An optimum control system composed of a servomechanism having a manipulating element driven by an on-off component. The on-off component operates by means of a switching signal which is calculated from the angular momentum of the manipulating element, the differential of the controlled variable of the servomechanism and the error between the reference input and the controlled variable.

This invention relates to techniques in the control of servomechanisms, and more particularly it relates to a new and improved method and means for effecting non-linear-optimum control of servomechanisms having a manipulating element driven by an on-off component, such as a relay or high-gain amplifier or like devices by means of relays or high-gain amplifiers with output saturation.

It is an object of the invention to reduce the adverse effects of load inertia variation on servomechanisms and to effect positive improvements in the characteristics of such servomechanisms.

The foregoing objects and other objects and advantages as will presently become apparent have been achieved by the system of the present invention, in which a switching signal which is calculated from angular momentum of the manipulating element (servomotor, etc.), derivative of the controlled variable, and deviation of the servomechanisms is applied to relays or high-gain amplifiers with output saturation, whereby unfavorable influence imparted to the said servomechanisms due to load variation is decreased, thus positively improving the characteristics of the said servomechanisms.

The nature, principle, and details of the invention will be more clearly apparent by reference to the following description, taken in conjunction with the accompanying drawings in which like parts are designated by like reference characters, and in which.

For a full understanding and appreciation of the nature and utility of the present invention, the following brief consideration of the prior art is believed to be necessary.

Figure 1:
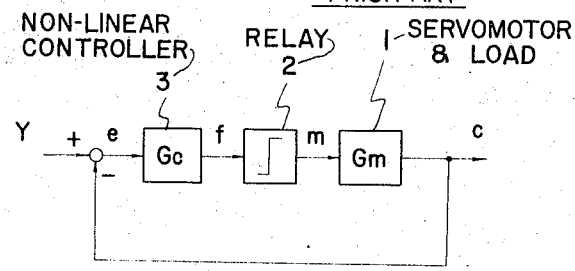
FIGURE 1 is a block diagram indicating an optimum non-linear control system of known type.

Referring to FIGURE 1, which illustrates one example of an optimum non-linear control system achieving optimum step response, the essential components shown are a servomotor and load 1, a relay 2, and a non-linear control device 3. The quantities associated with this system are a reference input $r$, an error $e$, a relay switching signal $f$, a manipulated variable $m$, and a controlled variable $c$. The non-linear control device 3, which computes an appropriate relay switching signal $f$ from the error $e$ and its differential $\dot{e}$, operates to suppress overshooting caused principally by the inertia of the servomotor and load 1 and to cause the step response of the servomechanism to be the optimum. Accordingly, this device 3 is designed on the basis principally of the characteristics of the servomotor and load 1. In general, the desired non-linear optimum controlling system is obtained by determining a trajectory produced on a phase plane having $e$ and $\dot{e}$ as coordinate axes by the servomechanism as described hereinbelow relative to only the case wherein the load is constant, applying the trajectory (switching curve), which is directed toward the origin indicated on this phase plane, as a suitable curve such as to coincide with the aforesaid objects, and effecting control so that the entire mechanism rapidly converges at the origin with respect to the various stepwise variations of reference input in accordance with the said curve.

Figure 2:
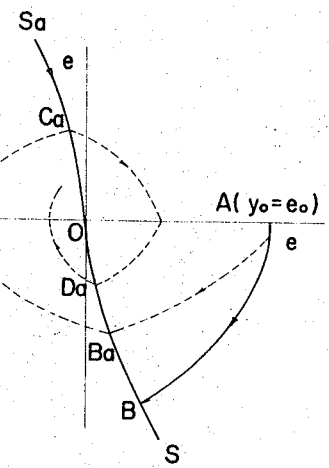
FIGURE 2 is a graphical representation in the form of a phase plane trajectory indicating the transient response of the system shown in FIGURE 1.

Such an optimum non-linear control is represented by one example in FIGURE 2, in which the curve $S_aOS$ is an optimum switching curve representing the control characteristic of the aforementioned control device 3. The switching signal $f$ becomes positive on the righthand side (as viewed in FIGURE 2) of this curve $S_aOS$ and becomes negative on the lefthand side thereof. When a step $r_0$ is introduced, the trajectory of the mechanism advances from point A toward point B, and intersects the curve SO at point B, whereupon the manipulated variable $m$ is switched, and the trajectory advances from point B toward the origin O, stopping without overshooting at the origin O. Thus, the conventional optimum non-linear control system of this type exhibits excellent step response and is effective in the case wherein the load is constant.

In many actual applications, however, the load inertias fluctuate when ordinary servomechanisms are used as may be observed in the case of manipulators and cranes. As one example, the case wherein the inertia of a load increases will be considered. In this case, the phase plane trajectory of the mechanism exhibits overshooting as indicated by the dotted-line curves in FIGURE 2 and assumes a vibratory state. Conversely, in the case wherein the inertia of the load decreases, the response deteriorates to an overdamped state. In either case, such a conventional control system lacks adaptability for load inertia variations, and it is difficult to accomplish truly optimum control through the use of such a system. That is, in spite of the fact that the phase plane trajectory of the mechanism is caused to vary by load inertia variation, the control characteristic (switching curve of the device 3) is merely maintained as usual in a constant, unchanged state. In order to accomplish optimum control of the mechanism even when the load inertia varies, it is necessary to provide the mechanism with adaptability by causing the control characteristic of the control device to vary in accordance with the load inertia variation and causing the manipulated variable to be constantly switched on the basis of new switching curves.

It is an object of the present invention to provide an optimum control system which fully meets the above stated requirement. Briefly described, the invention resides in a method and system wherein a switching signal $f$ is computed from the error $e$, the differential $\dot{e}$ of the controlled variable, and the angular momentum of the manipulator, and the switching curve is constantly maintained in its optimum state even when the load inertia varies.

Figure 3:
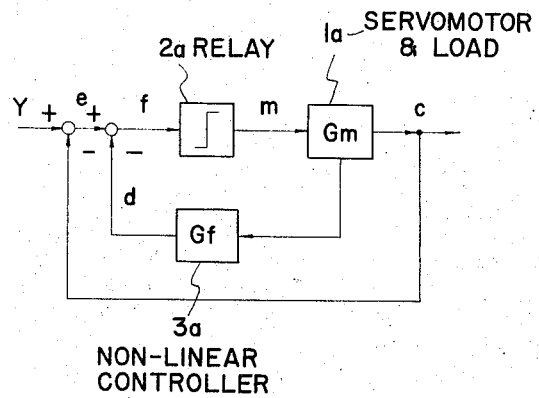
FIGURE 3 is a block diagram indicating a preferred embodiment of the optimum control system according to the invention.

In order to indicate still more fully the nature and principle of the invention, the following description with respect to a preferred embodiment thereof, as shown in FIGURE 3, is set forth, it being understood that this example is presented as illustrative only, and that it is not intended to limit the scope of the invention.

Referring to FIGURE 3, the system shown comprises a servomotor and load $1_a$, a relay $2_a$, and a non-linear control device $3_a$ for the purpose of extracting necessary signals from the servomotor and other elements and forming a switching signal $f$ from these signals and the error $e$.

First, the system will be considered for the case when the load is of inertial nature and is added to the inertia of the servomotor. Then, the transfer function $G_m(s)$ of the servomotor and the load may be expressed by the following well known equation.

$$G_m(s) = \frac{C(s)}{M(s)} = \frac{K_m}{s(Js+K_b)} \quad (1)$$

where: $s$ is a Laplace transformation operator; $K_m$ is the stall torque coefficient of the servomotor; $J$ is the moment of inertia of the servomotor and the load; and $K_b$ is the damping coefficient. The characteristics of the relay may be expressed by the following equation.

$$m(t) = M_o \text{ sgn } (f) = \begin{cases} M_o, f > 0 \\ 0, f = 0 \\ -M, f < 0 \end{cases} \quad (2)$$

where: $t$ is time variable, $M_o$ is the magnitude of the manipulated variable; and $f$ is the relay switching signal. Since the error is the difference between the reference input and the controlled variable, $$E(s) = R(s) - C(s) \quad (3)$$

If the reference input is taken as a step function, a control equation relating to the error with respect to the servomechanism shown in FIGURE 3 will be derived from Equations 1, 2, and 3, as follows:

$$T = \frac{d^2e}{dt^2} + \frac{de}{dt} = -N \text{ sgn } (f) \quad (4)$$

where:

$$T = J/K_b \text{ and } N = M_o \frac{K_m}{K_b}$$

The above Equation 4 may be rewritten as simultaneous equations, as follows:

$$\begin{cases} \frac{de}{dt} = \dot{e} & (5) \\ T\frac{d\dot{e}}{dt} + \dot{e} = -N \text{ sgn } (f) & (6) \end{cases}$$

If $dt$ is eliminated from both of the above equations, an equation representing the trajectory of this servomechanism on a phase plane having $e$ and $\dot{e}$ as coordinate axes can be obtained, as follows:

$$\frac{1}{T}\frac{de}{d\dot{e}} = \frac{-\dot{e}}{N \text{ sgn } (f) + \dot{e}} \quad (7)$$

As mentioned hereinbefore, the optimum switching curve is given by the system trajectory directed toward the origin of the phase plane and can be represented, as an approximation, by the following equation $$e + \frac{a^T}{2N}|\dot{e}|\dot{e} = 0 \quad (8)$$

where: $a < 1$.

In the case of an optimum non-linear control system of known type, in Equation 8, the quantity T is assumed to be constant, and the switching signal is determined from only $e$ and $\dot{e}$. For this reason, when this T varies because of load inertia variation, the control characteristics become poor as mentioned hereinbefore.

Accordingly, in the optimum control system of the present invention, the relationship of Equation 8 is modified in the following manner. That is, first, since the reference input is considered as a step function, Equation 8 is equivalent to the following equation.

$$e - \frac{a^T}{2N}|\dot{c}|\dot{c} = 0 \quad (9)$$

On one hand, the equation of motion of the rotational system consisting of the servomotor and the load is as follows:

$$T_m = J\frac{d^2c}{dt^2} \quad (10)$$

where: $T_m$ is the motor torque. Therefore, by integration of both sides of the above equation and determination of the angular momentum of the motor, the following equation is obtained.

$$\int_0^t T_m dt = J\frac{dc}{dt} = K_b T \dot{c} \quad (11)$$

Then, from Equations 9 and 11, the optimum switching curve for the case wherein load inertia variation is considered is obtained, as follows:

$$e - A|\dot{c}|\int_0^t T_m dt = 0 \quad (12a)$$

or, $$e - A\dot{c}\left|\int_0^t T_m dt\right| = 0 \quad (12b)$$

where:

$$A = \frac{a}{2NK_b} = \frac{a}{2M_oK_m}$$

While, in the above equations, the motor torque $T_m$ may be measured directly by means of a suitable torque transducer, it may also be computed from $m$ and $\dot{c}$ by utilizing the torque-speed characteristic of the motor as expressed by the following equations $$T_m = K_m m - K_b \dot{c} \quad (13a)$$

$$T_m = K_m m - K_b \dot{c} - K_c \dot{c}^2 \text{ sgn } (m) \quad (13b)$$

where: $K_c$ is the non-linear control coefficient.

Therefore, although the moment of inertia of the mechanism during operation cannot be detected directly, and although it is not possible to design from the form of the above Equation 8 an optimum control system of a mechanism having load inertia variation, it is possible to compute the angular momentum of the mechanism from the motor torque $T_m$, and it is possible, by determining the optimum switching curve of Equation 12 from $e$ $\dot{e}$, and $T_m$, to obtain an optimum control system having adaptability with respect to load inertia variation.

While, for the sake of convenience, the foregoing description has been presented with respect to a relay servomechanism, the optimum control system as described above can be similarly applied to other like mechanisms such as a servomechanism having a high-gain amplifier with output saturation.

Next, the non-linear control device $3_a$ which makes possible the realization of the above described control system will now be described in detail with reference to FIGURES 4 and 5, which show examples of specific composition and arrangement. The device shown in each figure comprises essentially an integrator 4 for computing angular momentum from the torque $T_m$, a multiplier 5, a comparator 6 and a relay $6_a$ for determining the start of integration and zero return from the normal state of the integrator 4, a component 7 for computing absolute value, and a coefficient multiplier 8.

Figure 4:
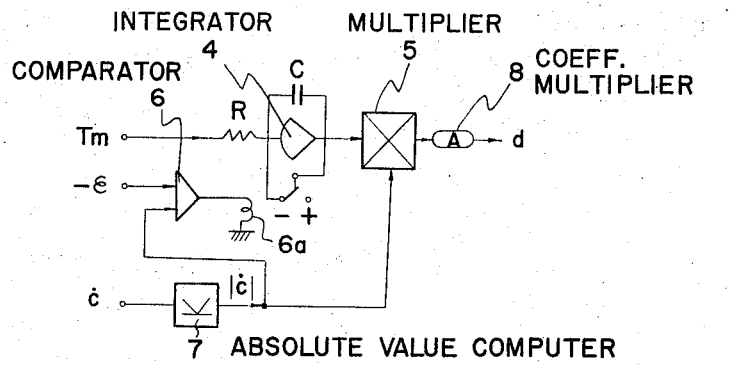
FIGURES 4, 5, and 6 are schematic diagrams indicating examples of composition and arrangement of non-linear controllers suitable for use in the embodiment indicated in FIGURE 3.
Figure 5:
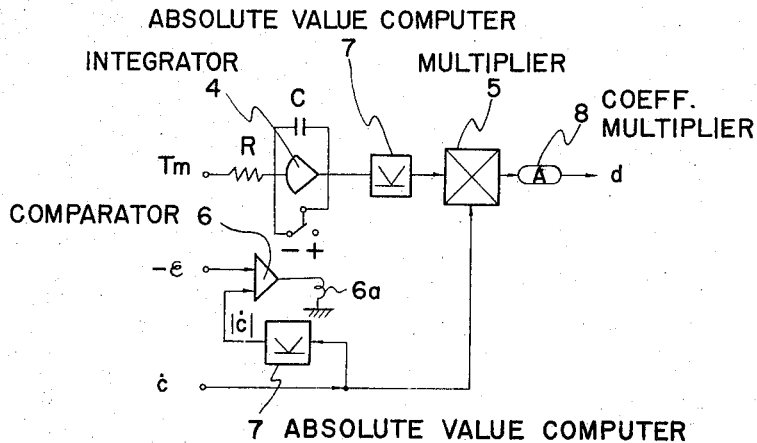
Figure 6:
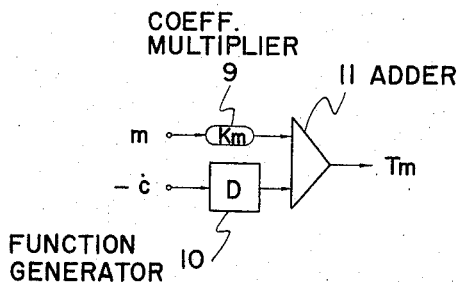

As can be observed from FIGURES 4 and 5, the cases represented by Equations 12a and 12b obtained hereinbefore correspond respectively to the devices shown in FIGURES 4 and 5. The motor torque $T_m$ is determined by utilizing a torque transducer or by utilizing the relationship expressed by Equation 13a or 13b through the use of a circuit as shown in FIGURE 6. The circuit shown in FIGURE 6 comprises essentially a coefficient multiplier 9, a function generator 10 for determining the damping characteristic of the motor, and an adder 11. The function generator 10 may be a simple coefficient multiplier in the case wherein Equation 13a is utilized, and is a simple generator such as a polygonal approximation function generator in the case wherein Equation 13b is utilized.

When, during the operation of the device of the above described composition and arrangement, a load inertia variation occurs, this variation is detected from the absolute value $|\dot{c}|$ of the derivative of the controlled variable. When this absolute value is greater than a certain predetermined value (that is, $|\dot{c}|>\epsilon$), the integrator operates to compute the angular momentum of the manipulator (more specifically, the servomotor and related parts), a required feedback signal $$d\left(d = A|\dot{c}|\int_0^t T_m dt \text{ or } A\dot{c}\left|\int_0^t T_m dt\right|\right)$$

is determined from the angular momentum so obtained and the derivative of the controlled variable, the said signal being positively fed back to the input side of the servomechanism to be added to the error $e$, and the optimum switching signal $f$ with respect to the load at the time is applied to the relay 2, whereby the required operation is obtained.

Although the comparator 6 is theoretically unnecessary in this device, the provision of the combination of the comparator 6 and the relay 6ₐ in actual practice is highly advantageous for the following reason. In a servomechanism containing such a manipulator a servomotor or like device, a static torque ordinarily exists constantly because of influences such as unbalance of the load, and it is necessary to prevent this torque from being integrated. Furthermore, in any type of control system in actual practice, there is always a steady output fluctuation which cannot be immediately considered to be an actual change of input. Therefore, the aforementioned combination of the comparator 6 and the relay 6ₐ is used to stop the functioning of the integrator 4 until the velocity of the controlled variable becomes greater than a certain value (that is, until $|\dot{c}|<\epsilon$). That is, by the use of the said combination, the aforesaid static torque will not be integrated, and, moreover, since a certain width ($\epsilon$) is thereby set in the non-linear control, only the true load inertia variation will be detected, whereby the desired control can be effected. Thus, the above stated problem can be completely solved.

As described above, the present invention provides an optimum control system in which on-off components such as relays are operated by optimum switching signals which are adaptive to any load inertia variation. Furthermore, the invention provides an optimum control system as described above which can be composed entirely of commonly used servo components. Accordingly, the invention is highly effective in improving the characteristics of servomechanisms having load inertia variation.

It should be understood, of course, that the foregoing disclosure relates to only a preferred embodiment, and a few examples of a component thereof, of the invention and that it is intended to cover all changes and modifications of the examples of the invention herein chosen for the purposes of the disclosure, which do not constitute departures from the spirit and scope of the invention as set forth in the appended claims.

What is claimed is:

1. In an optimum control system for servomechanisms including
    a manipulating element for manipulating a load, an on-off component for driving said manipulating element, and means for producing a switching signal for said on-off component in accordance with an error signal obtained from a reference input signal and a controlled variable of said load, an improvement which comprises: means for producing a torque signal corresponding to the torque of said manipulating element; means for integrating the torque signal to produce angular momentum of said manipulating element; means for producing a differential signal indicating a differential value of the controlled variable of said load; means for producing a product signal indicating a product of the output signal of said integrating means by the differential signal; means for producing an error signal from the controlled variable and the reference input signal; and means for adding the product signal to the error signal, thereby to produce the switching signal for said on-off component.

2. The optimum control system according to claim 1, wherein the
    improvement further comprises means for controlling said integrating means in accordance with the differential signal, thereby to prevent a static torque from being integrated.

3. The optimum control system according to claim 1, wherein said
    torque signal producing means comprises means for computing the torque of said manipulating element from a manipulated variable of said manipulating element and the differential signal of the controlled variable of said load.

References Cited
UNITED STATES PATENTS

| 2,906,933 | 9/1959 | Magnin | 318—448 |
| 3,250,898 | 5/1966 | Vasa | 318—448 |
| 3,283,230 | 11/1966 | Davies et al. | 318—30 |

BENJAMIN DOBECK, *Primary Examiner.*